United States Patent [19]

Yopp

[11] Patent Number: 5,373,445
[45] Date of Patent: Dec. 13, 1994

[54] METHOD AND APPARATUS FOR DETERMINING DYNAMIC FORCE WITHIN AN AIR SPRING SUSPENSION

[75] Inventor: Wilford T. Yopp, Canton, Mich.

[73] Assignee: Ford Motor Company, Dearborn, Mich.

[21] Appl. No.: 812,557

[22] Filed: Mar. 5, 1992

[51] Int. Cl.$^5$ .............................................. B60G 11/27
[52] U.S. Cl. ............................ 364/424.05; 364/550; 73/862.581; 280/702; 280/707; 280/840; 280/DIG. 1
[58] Field of Search ..................... 364/424.05, 550; 280/840, 6.1, 707, 709, 711, 712, DIG. 1, 688, 702; 177/184, 185, 208, 209, 254; 73/862.381, 862.581

[56] References Cited

U.S. PATENT DOCUMENTS

| | | | |
|---|---|---|---|
| 4,468,050 | 8/1984 | Woods | 280/707 |
| 4,634,142 | 1/1987 | Woods et al. | 280/707 |
| 4,651,838 | 3/1987 | Hamilton | 280/DIG. 1 X |
| 4,722,548 | 2/1988 | Hamilton et al. | 280/707 |
| 4,747,615 | 5/1988 | Yamamoto | 280/707 |
| 4,783,089 | 11/1988 | Hamilton et al. | 280/6.1 X |
| 4,805,710 | 2/1989 | Jarl et al. | 280/840 X |
| 4,822,063 | 4/1989 | Yopp et al. | 280/840 |
| 4,834,418 | 5/1989 | Buma et al. | 280/707 |
| 4,916,632 | 4/1990 | Doi et al. | 364/424.05 X |
| 5,020,825 | 6/1991 | Lizell | 280/707 |
| 5,029,328 | 7/1991 | Kamimura et al. | 364/424.05 |
| 5,060,959 | 10/1991 | Davis et al. | 280/6.1 |
| 5,123,671 | 6/1992 | Driessen et al. | 280/707 |
| 5,138,554 | 8/1992 | Wada | 364/424.05 |

Primary Examiner—Kevin J. Teska
Assistant Examiner—Collin W. Park
Attorney, Agent, or Firm—Gregory P. Brown; Roger L. May

[57] ABSTRACT

An apparatus and method for determining the force produced by an air spring assembly is disclosed. The apparatus includes mechanisms for determining the position, velocity, and direction of movement of the chassis relative to the wheel and tire assembly as well as a mechanism for measuring the pressure within the air spring. A processor is utilized to determine the force produced by the air spring based upon these measured parameters. A method for determining the air spring force is also disclosed.

4 Claims, 8 Drawing Sheets

METHOD AND APPARATUS FOR DETERMINING DYNAMIC FORCE WITHIN AN AIR SPRING SUSPENSION

BACKGROUND OF THE INVENTION

1. Field of the Invention

The present invention relates generally to air spring assemblies for use in automotive vehicle suspensions. More particularly, the present invention relates to a method and apparatus for determining the force produced by an air spring assembly.

2. Disclosure Information

Gas suspensions have been popularly used for controlling vehicle attitude either alone or in combination with other suspension systems. For example, U.S. Pat. No. 4,834,418 discloses an electronically controlled gas suspension for controlling vehicle attitude. Air spring assemblies have also been used in conjunction with active suspension systems such as shown in U.S. Pat. No. 5,060,959, assigned to the assignee of the present invention, which shows the use of an air spring assembly in conjunction with an electric active suspension unit. In the '959 patent, the air spring assembly is used to carry the static load of the vehicle so that the active suspension component can respond to the road force inputs only. The suspension unit of the '959 patent is provided with means to measure the force produced by the air spring so as to apportion the total load between the air spring and the active suspension component. The '959 patent proposes the use of a pair of load cells to determine the load carrying forces generated by the air spring and the electric active suspension so that the fraction of the total load carried by each of the air spring and the electric unit can be determined. Using a load cell accurately measures the force produced by the air springs, but load cells add weight to a vehicle and can be expensive when adding a plurality of load cells to each corner unit of the vehicle. Therefore, it would be advantageous to eliminate at least one of the load cells and still determine the load carrying force produced by the air spring to apportion the load between the air spring assembly and the active suspension component. Furthermore, in more conventional suspension systems, it would be desirable to know the load carrying force produced by the air spring assembly so that proper switching of an adjustable suspension unit can be accomplished to improve ride and handling characteristics of the vehicle.

U.S. Pat. No. 4,651,838 proposes a system and method for load leveling of a vehicle which measures the force produced by the air spring assemblies without use of a load cell. The method and apparatus include inflating an inflatable member of the air spring with a compressed gas at a substantially constant flow rate and sensing the pressure of the gas within the member during inflation. The pressure sensing occurs at substantially even time intervals. From the pressure value, a pressure-time history for the inflation of the member is generated and from this pressure-time history, force produced by the air spring for a static vehicle can be determined. However, the system of the '838 patent is not a dynamic system, relying only upon the inflating of the pressure member for a static, non-moving vehicle. The system does not take into account chassis dynamics, such as the velocity of the chassis relative to the wheel and tire assembly or the direction of movement of the chassis relative to the wheel and tire assembly which, as will be shown below, have a distinct effect on the force produced by the air spring assembly.

SUMMARY OF THE INVENTION

It is an object of the present invention to determine the force produced by an air spring assembly without the need for a load cell.

It is a further object of the present invention to determine the force produced within an air spring assembly dynamically so that the force is continuously computed while the vehicle is traveling.

In a principal aspect of the present invention, there is disclosed herein a method for determining force produced by an air spring assembly interposed between a wheel and tire assembly and the chassis of an automotive vehicle comprising the steps of: determining the position of the vehicle chassis relative to the wheel and tire assembly and producing a first value representing that position; determining the velocity of the chassis relative to the wheel and tire assembly and producing a second value representing that velocity; and determining the direction of movement of the chassis relative to the wheel and tire assembly and producing a third value representative thereof. The method further includes the steps of measuring the pressure within an inflatable member of the air spring assembly and producing a fourth value representative thereof and deriving from the first, second, third and fourth values a fifth value representing the magnitude of the force produced by the air spring assembly. The step of deriving the fifth signal comprises the step of matching the first, second, third and fourth values with one of a plurality of reference value sets comprising chassis position, chassis velocity, chassis direction and air spring pressure values wherein each of the reference value sets corresponds to a predetermined value of the air spring force depending upon the results of the matching.

The present invention further provides an apparatus for determining force produced by an air spring assembly interposed between a wheel and tire assembly and a chassis of an automotive vehicle. The apparatus comprises height measuring means for continuously measuring the distance between the vehicle chassis and the wheel and tire assembly and producing a first value representative thereof; velocity measuring means for determining the velocity of the vehicle chassis relative to the wheel and tire assembly and producing a second value representative thereof; and means for determining the direction of movement of the chassis relative to the wheel and tire assembly and producing a third value representative thereof. The apparatus further includes pressure measuring means for measuring the pressure within an inflatable member of the air spring assembly and producing a fourth value representative thereof and a processor means for deriving from the first, second, third and fourth values of this value representing the magnitude of the force produced by the air spring assembly. The processor means derives the fifth signal by matching the first, second, third and fourth values with one of a plurality of reference value sets comprising a chassis position, chassis velocity, chassis direction, and air spring pressure values, wherein each of the reference value sets corresponds to a predetermined value of the air spring force depending upon the results of the matching.

These and other objects, features and advantages of the present invention will become apparent from the following drawings, description and claims which follow.

DETAILED DESCRIPTION OF THE PREFERRED EMBODIMENT

Figure 1:
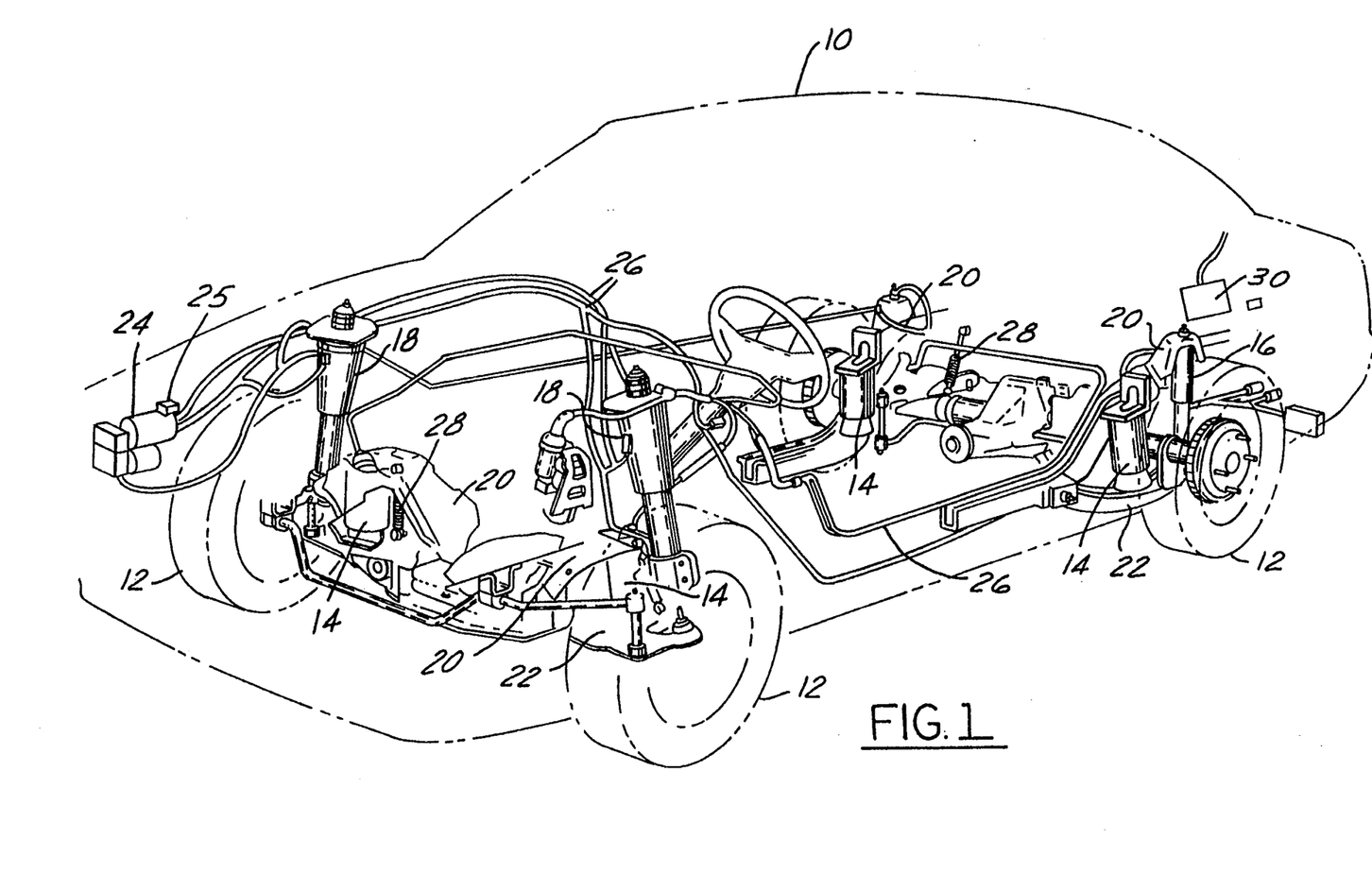
FIG. 1 is a perspective view of an automotive suspension employing air spring assemblies structured in accord with the principles of the present invention.
Figure 2:
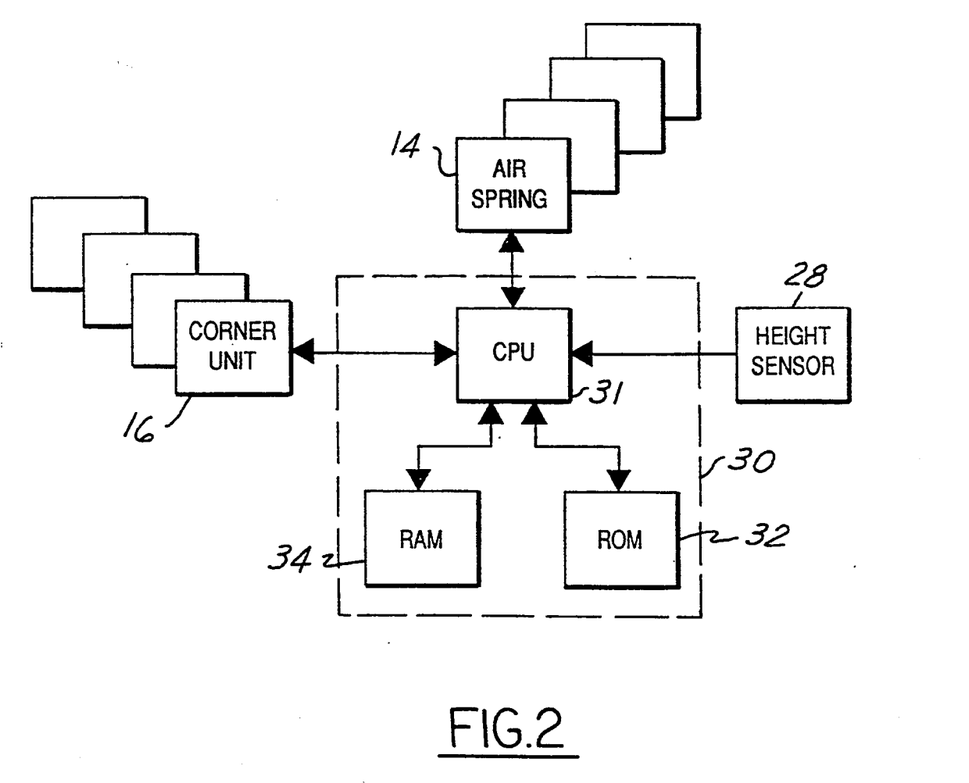
FIG. 2 is a schematic block diagram of the system of the present invention.

As shown in FIGS. 1 and 2, a vehicle 10 is equipped with a plurality of wheel and tire assemblies 12. Vehicle 10 further includes a plurality of air spring assemblies 14 shown as being a typical rolling lobe type of air spring. It should be apparent to those skilled in the art that other types of air springs may be utilized in the present invention, such as bellows-type air springs or other air springs commonly used in the automotive suspension art. The vehicle may also include additional suspension units such as shock absorber 16 or adjustable suspension units 18 or may be equipped with a single suspension unit incorporating both the air spring assembly and an active suspension component such as is shown in U.S. Pat. No. 5,060,959 at FIGS. 2 and 4, the disclosure which is hereby incorporated by reference. Each air spring assembly 14 and suspension unit 16, 18 are mounted between chassis 20 (the sprung vehicle mass) and a lower control arm 22 (a portion of the unsprung vehicle mass).

Each of the air spring assemblies communicates with a compressor 24 which supplies compressed air to each of the inflatable members of the air spring assemblies 14 through conduits 26. The compressor includes a regenerative air dryer as well as a pressure transducer 25 for measuring the amount of pressure supplied to each of the air spring assemblies 14. A typical compressor (without the attached pressure sensor) used in the present invention is manufactured by Tokico America.

The vehicle 10 also includes a plurality of height sensors 28 interposed between the sprung and unsprung vehicle masses. FIG. 1 shows the placement of two height sensors comprising linear variable differential transducers (LVDT) in proximity to two vehicle wheels 12. It should be readily apparent that two additional height sensors are disposed proximate the other two wheels of FIG. 1. The vertical motion of the wheel assemblies 12 with respect to the chassis 20 will be accompanied by motion of the sliding sensor components with respect to each other. In this manner, sensors 28 keep track of the vertical location of the wheel and tire assembly relative to the chassis of the vehicle. Those skilled in the art will appreciate a view of this disclosure that other types of position sensors such as rotary Hall Effect or other types of linear or rotary devices may be applied to a system according to the present invention. For example, the rotary height sensor of U.S. Pat. No. 4,822,063, assigned to the assignee of the present invention, the disclosure of which is hereby incorporated by reference, is very useful for practicing the present invention. The sensol of the '063 patent generates a plurality of position signals including both unique and non-unique signals to determine the direction of travel of the chassis relative to the vehicle wheel. Furthermore, as is also taught in the '063 patent, by differentiating the chassis position with respect to time, the chassis velocity relative to the wheel and tire assembly can also be calculated. (See column 5, line 45-column 6, line 46 of the '063 patent which is hereby incorporated by reference). As such, the height sensor assemblies comprise means for determining the chassis position, chassis velocity, and chassis directional movement with respect to the wheel and tire assemblies. As will become apparent from the mappings shown in FIGS. 3-11, the parameters of chassis position, chassis velocity and chassis direction relative to the wheel and tire assembly as well as the pressure within the inflatable member of the air spring assemblies 14 will become critical in determining the force produced by each of the air spring assemblies.

The air spring assemblies 14 as well as the pressure transducer 25 and the height sensors 28 communicate electrically with a system control module 30. The control module 30 comprises a microprocessor controller and appropriate input and output devices including analog to digital and digital to analog converters. The microprocessor preferably comprises a read-only memory 32 (ROM) for storing various constants and control programs for controlling the suspension system. The microprocessor further includes a central processing unit (CPU) 31 for reading out control programs from the ROM to execute required operations, as well as a random access memory 34 (RAM), which temporarily stores various data related to the operations to be executed within the CPU 31, and which allows the CPU to read out the data stored therein. The microprocessor further includes a clock generator which generates clock pulses in response to which the operations are executed in the microprocessor. Those skilled in the art will appreciate in view of this disclosure that the present invention may be practiced with the aid of several different types of microprocessors, such as the Motorola type 6805 or Intel Corp. type 8051 as well as several different types manufactured by several different companies.

Force produced by an ideal air spring can be determined according to:

Force=(internal air pressure)×(effective piston area), or $F=(P)\times(A)$

Figure 3:
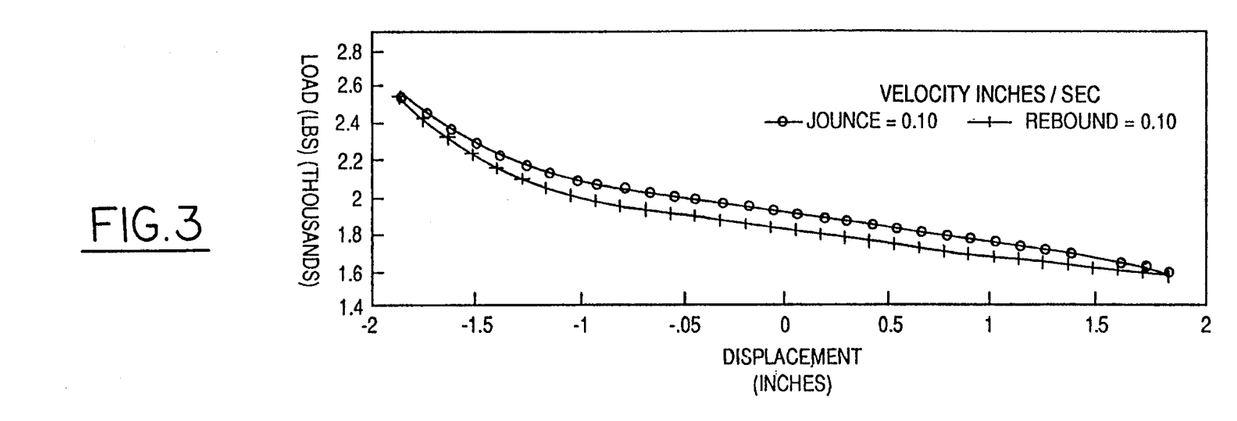
FIG. 3 is a mapping of force vs. displacement for an air spring assembly cycled through jounce and rebound directions at a velocity of 0.10 in/sec.
Figure 4:
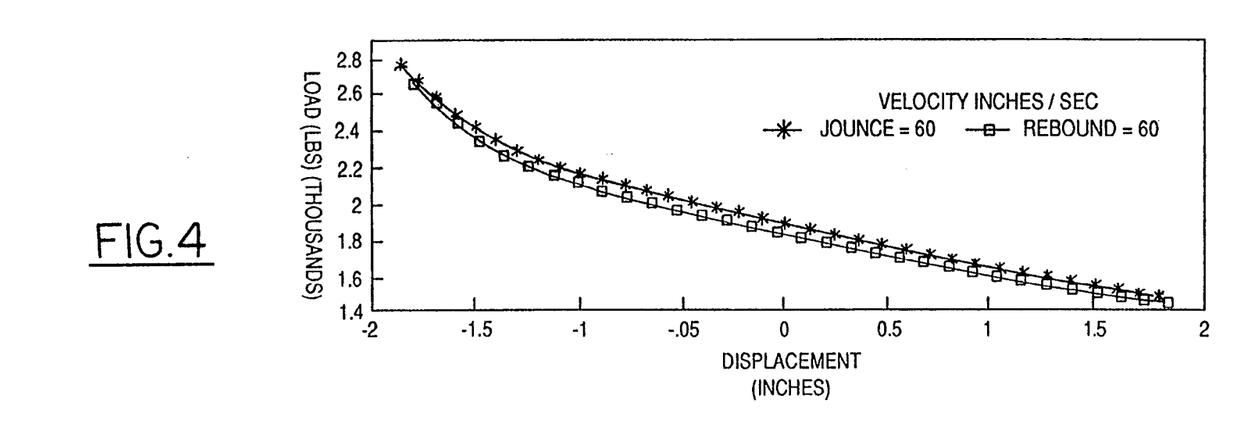
FIG. 4 is a mapping similar to FIG. 3 but cycled at a velocity of 60 in/sec.

However, automotive air springs are generally not ideal. The force exerted by an air spring is dependent upon its direction of travel (jounce or rebound) as is shown in FIGS. 3 and 4. To develop the mapping shown in FIGS. 3 and 4 as well FIGS. 5–11, a Firestone rolling lobe air spring was installed in an MTS performance test stand. The air spring was positioned at design, or "trim" height and load conditions. The MTS ram was controlled to give a constant velocity stroke through jounce and rebound directions. During this stroking of the MTS ram, the following air spring parameters were recorded: displacement, velocity, load and internal air pressure as will be shown in the following FIGS. 3–11. The velocities ranged from 0.01–60 in/sec.

FIGS. 3 and 4 show that a definite hysteresis is present between the jounce and rebound stroke of the air spring. In each mapping, the upper line represents the load vs. displacement curve in the jounce direction, or as the air spring is being compressed from a positive displacement value (+2) toward a negative value (−2) while the rebound direction is shown as the line below the jounce line. As can be seen, the distance or area between these two lines represents the hysteresis effect occurring in the air spring, most notably due to the material from which the air spring is manufactured. FIG. 3 shows this effect at a stroke velocity of 0.10 in/sec. while FIG. 4 shows the amount of hysteresis at a stroke velocity of 60 in/sec. As can be seen by comparing the two graphs, the stroke velocity of the air spring has a definite effect upon the amount of hysteresis, that being the slower the stroke velocity the larger the amount of hysteresis. For example, in FIG. 3, at a trim height of zero, the load ranges from approximately 1800 lbs. to 1900 lbs. for hysteresis of approximately 100 lbs. This amount of hysteresis can become critical especially in an active suspension application wherein an electric motor is being used to apportion the road input forces. However, as shown in FIGS. 3 and 4, the hysteresis at the higher stroke velocity, 60 in/sec., is approximately equal to 60 lbs. FIGS. 3 and 4 therefore demonstrate that the direction of movement of the sprung mass relative to the unsprung mass effects the force produced by the air spring.

Figure 5:
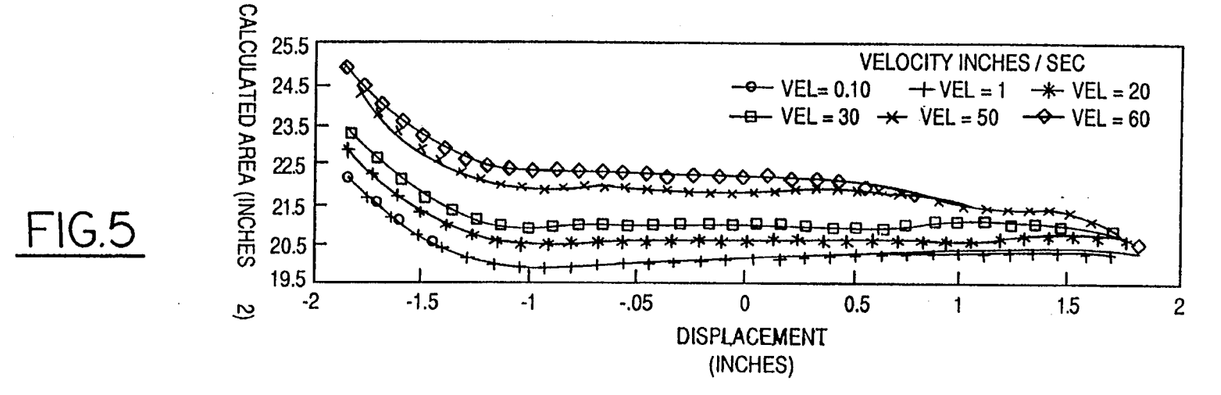
FIG. 5 is a mapping of the air spring area vs. displacement in the jounce direction only at various velocities.
Figure 6:
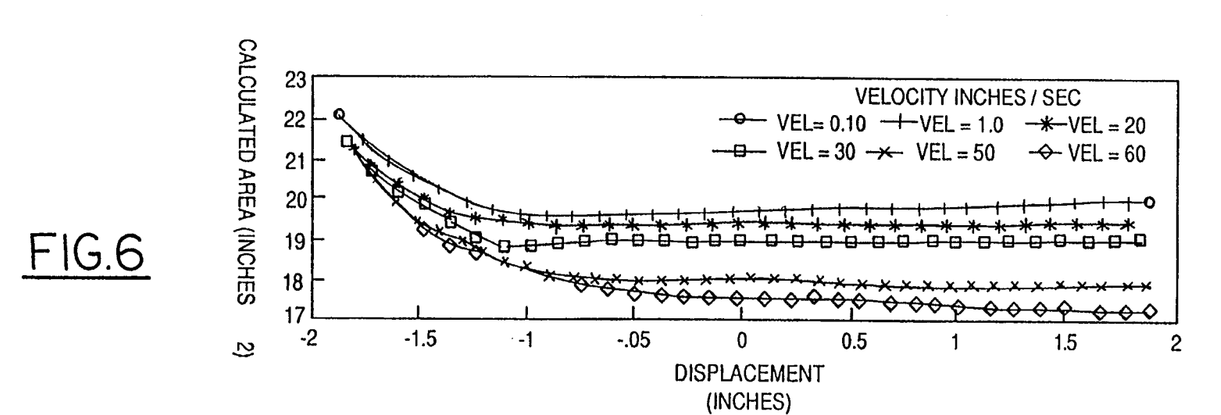
FIG. 6 is a mapping similar to FIG. 5 but in the rebound direction.

FIGS. 5 and 6 show the effect that velocity of the chassis relative to the vehicle wheel (or stroke velocity) has on the force produced by the air spring as shown by calculating the area of the air spring. The area of the air spring can be calculated from the equation:

$F = P \times A$ $A = F/P.$

By measuring the force produced by the air spring with the MTS machine as well as measuring the internal pressure of the air spring, the area can be calculated. FIGS. 5 and 6 show this calculation for velocities ranging from 0.10–60 in/sec. for the jounce and rebound directions, respectively. As can be seen, at design height (zero on the displacement axis) the calculated areas range from about 22–20 in$^2$ in the jounce direction and approximately 19.8–17.5 in$^2$ in the rebound direction. Given this variation in the calculated area of the air spring, and the difficulties in measuring the effective area while the air spring is being stroked, FIGS. 5 and 6 show that velocity has an effect upon force produced by the air spring since force is proportional to the effective area. Since it is nearly impossible to measure the effective area of the air spring, especially while the vehicle is moving, one cannot calculate force solely from the parameters of air spring pressure and effective air spring area.

Figure 7:
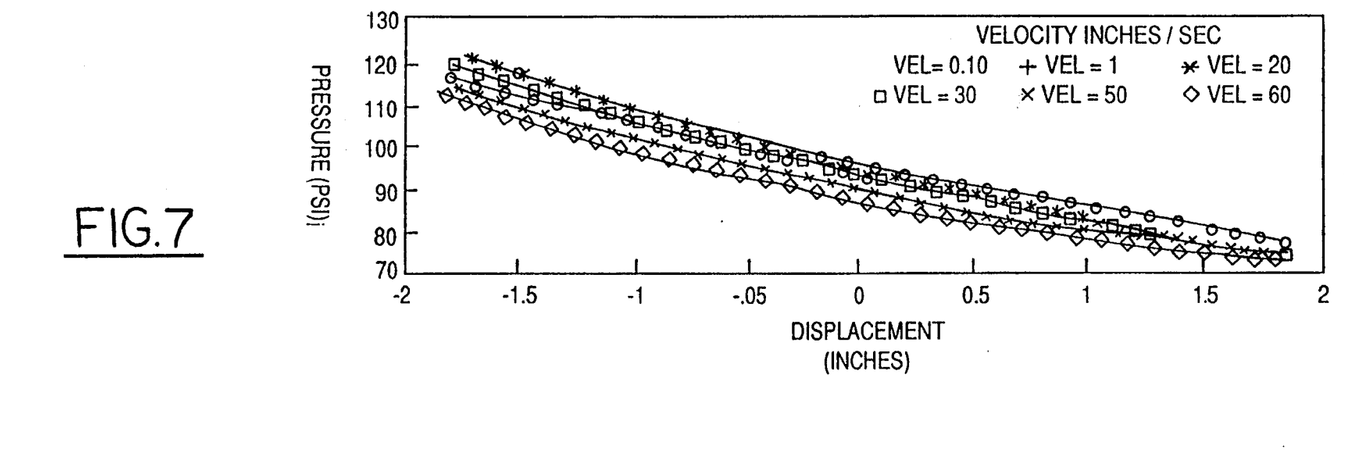
FIG. 7 is a mapping of the air spring pressure vs. displacement in the jounce direction at various velocities.
Figure 8:
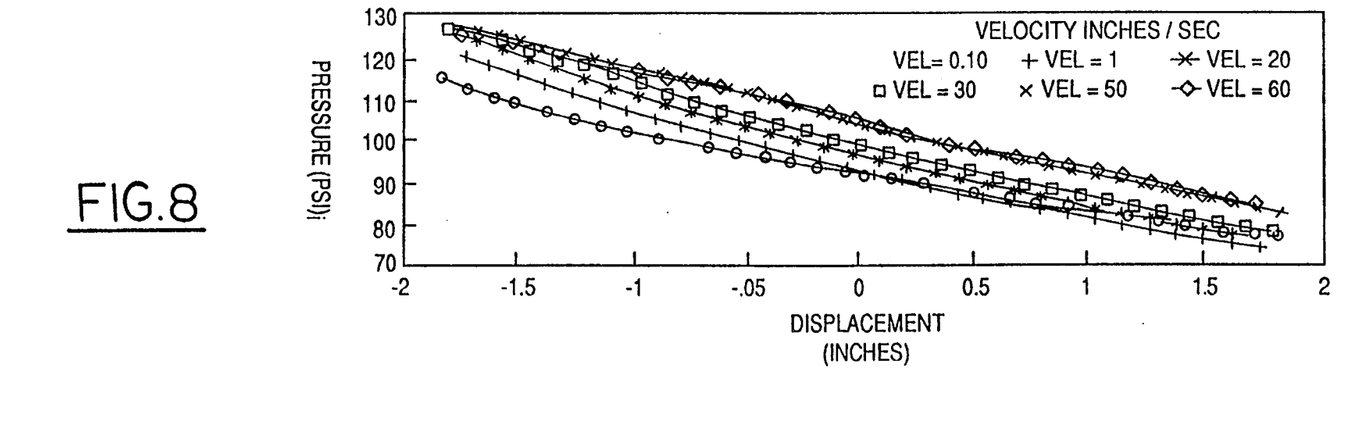
FIG. 8 is a mapping similar to FIG. 7 but in the rebound direction.

FIGS. 7 and 8 further show the effect that chassis velocity has on the determination of the force produced by the air spring assembly. FIGS. 7 and 8 are a mapping of pressure within the air spring, as determined by a pressure transducer 25 located either at the compressor 24 or at the air spring itself vs. the displacement of the air spring for both the jounce and rebound directions, respectively. As shown in FIG. 7 at the design height, the pressures can vary by an amount of approximately 10 psi in the jounce direction and as shown in FIG. 8 approximately 15 psi in the rebound direction. FIGS. 7 and 8 further show that chassis position relative to wheel assembly effects the air spring pressure simply by looking at the curves from a displacement of −1 to +1. In the jounce direction of FIG. 7, at a displacement of −1, the pressure readings vary between approximately 100–110 psi while at the +1 position, the pressure in the air spring ranges between 80–85 psi. Similarly, FIG. 8 shows that in the rebound direction, the pressure at a −1 displacement ranges from approximately 100–120 psi while at a +1 displacement the pressure ranges from between 80–90 psi. Therefore, FIGS. 7 and 8 show that it is important to know which direction the chassis is moving relative to the wheel assemblies in calculating the force produced by an air spring.

Figure 10:
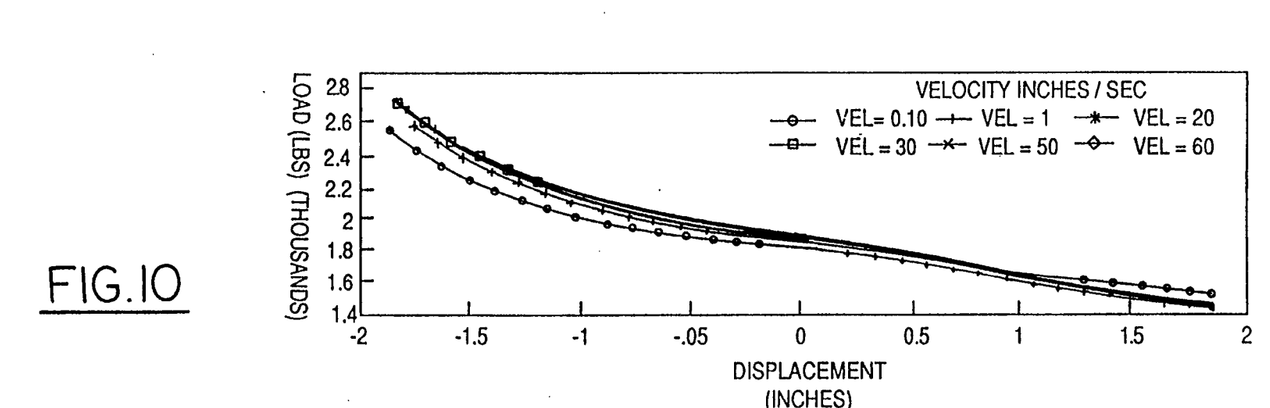
FIG. 10 is a mapping similar to FIG. 9 but for the rebound direction at various velocities.
Figure 11:
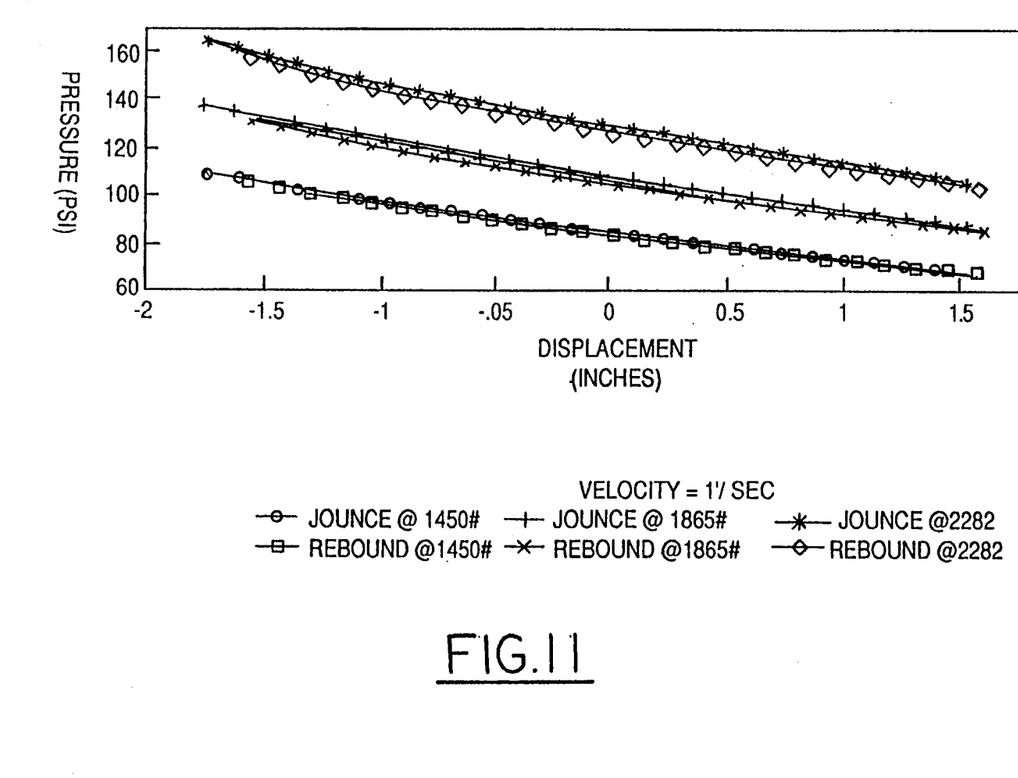
FIG. 11 is a mapping of air spring pressure vs. displacement at the velocity of 1.0 in/sec. for different vehicle weights.

FIG. 11 shows a mapping of the measured pressure in the air spring vs. displacement in the jounce and rebound direction at three different applied loads and at a velocity of 1.0 in/sec. The lowermost lines represent the smallest applied load (1450 lbs.), the middle lines represent an intermediate applied load (1865 lbs.) while the upper lines represent the largest applied load (2282 lbs.). These data were obtained by measuring the pressure with a pressure transducer in an air spring having a fixed volume of gas while subjecting the air spring to the above loads and cycling the spring on the MTS machine at 1.0 in/sec generally as described above. As can be seen, the pressure vs. displacement curves are fairly constant at the known, applied loads. These data can be generated for a number of other known applied loads at different stroke velocities and these data are stored in the ROM of the microprocessor 30. Alternatively, intermediate values can be extrapolated from measured values since the relationships are relatively linear. Once these data are known and stored, by measuring the pressure within he air spring, and knowing the chassis position, chassis velocity and chassis direction of movement, the load produced by the air spring can be determined. For example, measuring an air spring pressure of 80 psi at design height (zero displacement) in the jounce direction at a velocity of 1.0 in/sec corresponds to a load of 1450 lbs. exerted by the air spring. Similarly, the load exerted by the air spring at other velocities can be determined by generating measured test data and storing data for the known velocities in the ROM. The mappings of FIGS. 9 and 10, also stored in the ROM, prove useful in the determination of air spring force at different velocities.

Figure 9:
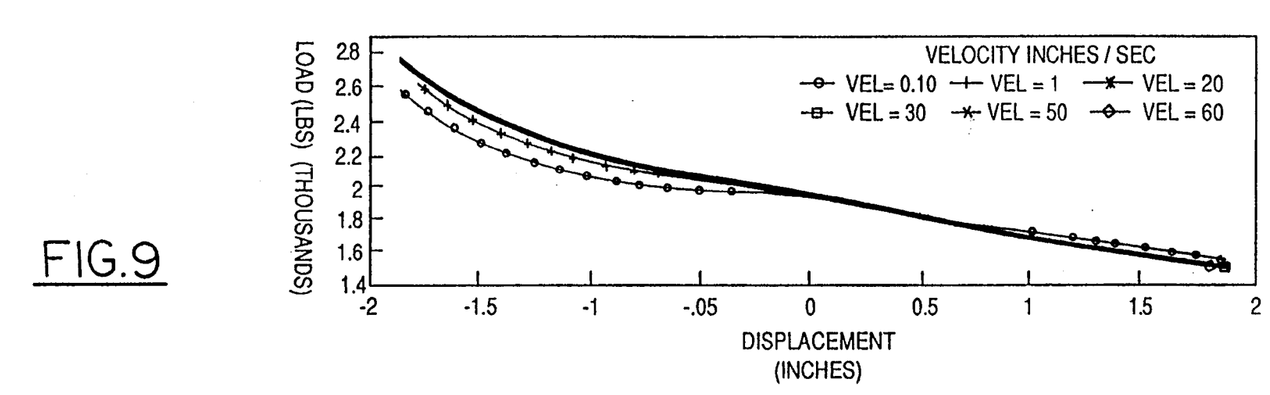
FIG. 9 is a mapping of air spring force vs. displacement in the jounce direction and various velocities.

FIGS. 9 and 10 show the mapping of the force (load, lbs.) produced by the air spring as measured by the MTS machine as a function of the displacement of the air spring at a variety of velocities ranging from 0.10–60 in/sec. As can be seen in FIGS. 9 and 10, the test data show that for displacement velocities greater than 1.0 in/sec., the load/force produced by the air spring is fairly constant. However, it can be seen that the load values for a chassis velocity of 0.10 in/sec are somewhat shifted relative to the other measured velocities, thus showing the importance of measuring and storing data at different chassis velocities. As above, it is not necessary to measure and store air spring force for every intermediate velocity since intermediate values can be extrapolated due the linear relationships shown in FIGS. 9 and 10. By utilizing this constant relationship, the force produced by the air spring can be determined by storing the mappings of FIGS. 9 and 10 of force vs. displacement at predetermined velocities and chassis directions into the ROM 32 of the microprocessor and a similar determination to that explained above with respect to FIG. 11 can be performed.

As shown above with respect to FIGS. 3–8, the force produced by the air spring is effected by the chassis velocity, the chassis direction and the chassis position relative to the wheel and tire assembly as well as the internal air spring pressure. By measuring these parameters and comparing these instantaneous measurements at any interval of time to the mappings stored in the ROM representative of FIGS. 9, 10 and 11, the air spring force produced at that instant can be determined by matching the measured values with the one of a plurality of reference value sets for the measured parameters. As such, the processor comprises means for matching the signals representative of the measured parameters of chassis velocity, direct and position as well as air spring pressure to one of a plurality of reference value sets stored in the ROM analogous to the mappings of FIGS. 9, 10 and 11 wherein each of the reference set values corresponds to a force that the air spring is exerting.

Figure 12:
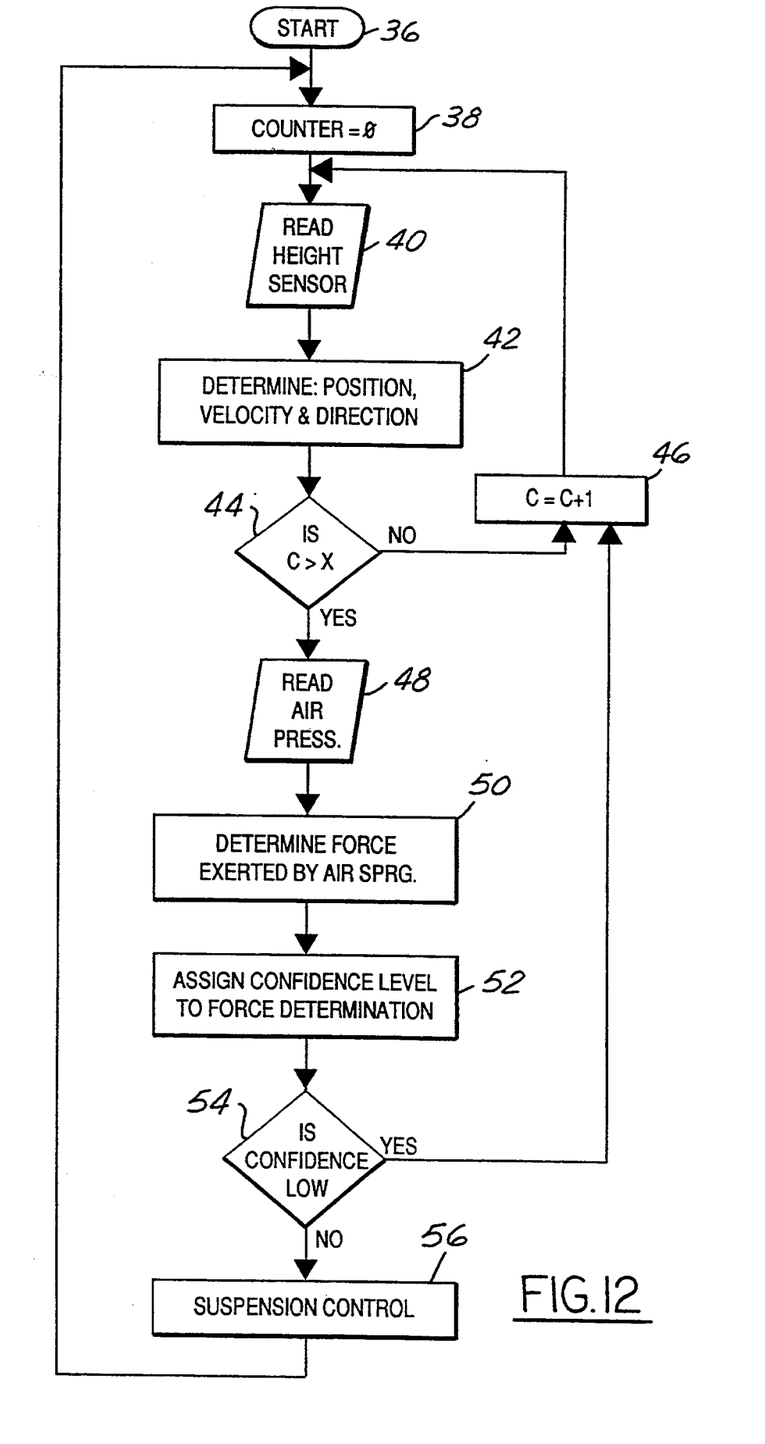
FIG. 12 is a logic flow block diagram of the method of the present invention.

Referring now to FIG. 12, the method of the present invention is shown beginning at start block 36. At block 38, a counter (C) within the processor set to zero and at block 40 the measurements from the height sensors 28 are fed into the processor. From the height sensor signals, the processor determines the chassis position relative to the wheel and tire assembly and the direction of movement of the chassis relative to the wheel assembly at block 42. Furthermore, at block 42, the processor determines the velocity of the chassis relative to the wheel assembly by differentiating the chassis positions with respect to time as is well known in the art. At block 44, the processor determines whether the counter has reached a predetermined number of iterations, shown as X, and if not, at block 46 the counter incremented by 1 and the method returns to block 40. If, however, the counter has exceeded the iteration threshold at block 44, the method proceeds to block 48 wherein the internal air pressure of the air spring is read. This can be done in a number of known ways, such as by providing a pressure transducer directly onto to the inflatable member of the air spring and electrically communicating this pressure signal to the processor where it is digitized or by incorporating a pressure transducer into the compressor itself so that the pressure transducer can sequentially read the pressures supplied to each of the air springs. The air pressure can be read after the required number of iterations of the determinations of chassis position, velocity and direction since it is not as necessary to know the internal air pressure as quickly as the other chassis parameters. At block 50, the processor reads the instantaneous values of the air pressure, chassis position, chassis velocity and chassis direction and matches those values with a one of a plurality of reference value sets stored in the ROM of the microprocessor and corresponding to the measured mappings of FIGS. 9, 10 and 11. Each one of these reference value sets corresponds to a unique magnitude of force produced by the air spring in the lookup table or the ROM. The air spring force can be determined at any instantaneous moment even when the vehicle is traveling.

The method of the present invention further contemplates assigning a confidence level to the force determination at block 52. This can entail any number of known methods for determining confidence, such as by only taking readings of the required parameters between specific stroke displacements over predetermined periods of time and counting those iterations meeting the required constraints. At block 54, the processor determines whether the required confidence level has been met and if not, the method returns to block 46 to begin the method again. However, if the required confidence level has been met, the appropriate control signal is sent to the suspension units, those being adjustable or active suspension units to control the units in accordance with the required parameters.

The present invention further contemplates determining the weight of the vehicle as shown by mapping the parameters of pressure in the air spring vs. displacement at a variety of velocities such as is shown in FIG. 11. As described above, FIG. 11 is a mapping of the pressure in the air spring vs. displacement in the jounce and rebound direction at three different applied loads and at a velocity of 1.0 in/sec. As can be seen, the pressure vs. displacement curves are fairly constant at the representative loads. By mapping a plurality of these measured data at various known, applied loads and different stroke velocities, and storing these values into a ROM, generally as described above, the weight at each corner of the vehicle can be determined by matching the pressure of the air spring, the velocity of the chassis relative to the wheel assembly and the chassis position and chassis direction of movement, with one of a plurality of reference value sets corresponding to applied load. The gross vehicle weight can be determined by adding each corner weight as determined. Determining the weight distribution at each corner of the vehicle becomes important when the vehicle is equipped with various dynamic control modules, such as suspension control, braking system control and steering control. By knowing the weight of the vehicle at each corner, it becomes possible to control the chassis dynamics at each corner. For example, if it is determined that one corner is heavier than the other vehicle corners, and the vehicle is equipped with adjustable shocks or an antilock braking system, it is possible to command those systems to behave in the most beneficial way, such as by adjusting the shock to a firmer setting than the other shocks to compensate for the added weight. It should be readily apparent to those skilled in the art that other such control schemes can be performed when it is possible to determine the weight of the vehicle at each corner.

The present invention provides advantages over the prior art by determining dynamically the air spring force at an instantaneous moment while the vehicle is traveling. Various other modifications and variations of the present invention will, no doubt, occur to those skilled in the art. For example, each of the mapping shown in FIGS. 4–11 are for a specific type of air spring. It should be apparent to those skilled in the art that various other air springs may generate significantly different mapping based upon other characteristics known to those air springs. It is the following claims, including all equivalents, which define the scope of my invention.

What is claimed is:

1. A method for controlling a vehicle suspension system having an air spring assembly interposed between a wheel and tire assembly and a chassis of an automotive vehicle, comprising the steps of:

determining a position of said vehicle chassis relative to said wheel and tire assembly and producing a first value representative thereof;

determining a velocity of said vehicle chassis relative to said wheel and tire assembly and producing a second value representative thereof;

determining a direction of movement of said chassis relative to said wheel and tire assembly and producing a third value representative thereof;

measuring a pressure within an inflatable member of said air spring assembly and producing a fourth value representative thereof;

deriving a fifth value by matching said first, second, third and fourth values with one of a plurality of reference value sets comprising chassis position, chassis velocity, chassis direction, and air spring pressure values, wherein each of such reference value sets corresponds to a predetermined value of said fifth value depending upon the results of said matching, said fifth value representing the magnitude of said force produced by said air spring assembly;

assigning a confidence value to said fifth value depending upon said third and fourth values;

reiterating said steps of producing the first, second and third values a predetermined number of times prior to said step of producing a fourth value; and controlling said suspension system based on said fifth value and said confidence value.

2. A method according to claim 1, wherein said deriving is performed by a processor means comprising a read-only memory containing said reference value set and said fifth values.

3. A suspension system for an automotive vehicle having a chassis and a pair of rear wheel assemblies, comprising:

at least two air spring assemblies, each air spring assembly disposed in proximity to said rear wheel assemblies of said vehicle, each air spring assembly including an inflatable member operative to be pressurized with a fluid, force measuring means for determining a force produced by each of said at least two air spring assemblies, said force measuring means comprising:

height measuring means for measuring a distance between the vehicle chassis and the wheel assembly and producing a distance signal representative thereof;

pressure measuring means for measuring a pressure within said inflatable member of said air spring assembly and producing a pressure signal representative thereof; and processor means for determining a velocity and direction of movement of said vehicle chassis relative to said wheel assembly from said distance signal, said processor means being further adapted for deriving a magnitude of said force produced by said air spring assembly by matching said pressure signal, and said velocity and direction of movement of said vehicle chassis with one of a plurality of reference value sets comprising chassis position, chassis velocity, chassis direction, and pressure values, wherein each of such reference value sets corresponds to a predetermined value of force magnitude depending upon the results of said matching.

4. An apparatus according to claim 3, wherein said processor means comprises a read-only memory containing said reference value sets and said force magnitude values.

* * * * *